US007412490B2

(12) United States Patent
Matsa et al.

(10) Patent No.: US 7,412,490 B2
(45) Date of Patent: Aug. 12, 2008

(54) ROUTING INSTANT MESSAGES USING CONFIGURABLE, PLUGGABLE DELIVERY MANAGERS

(75) Inventors: Moshe M. E. Matsa, Cambridge, MA (US); Julius Q. Quiaot, San Jose, CA (US); Christopher R. Vincent, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 619 days.

(21) Appl. No.: 11/037,857

(22) Filed: Jan. 18, 2005

(65) Prior Publication Data
US 2005/0125499 A1    Jun. 9, 2005

Related U.S. Application Data

(62) Division of application No. 09/866,410, filed on May 25, 2001.

(51) Int. Cl.
*G06F 15/16* (2006.01)
(52) U.S. Cl. .................... 709/206; 709/203; 709/217; 709/223
(58) Field of Classification Search ............... 709/206, 709/205, 203, 217, 219, 223, 224
See application file for complete search history.

(56) References Cited

U.S. PATENT DOCUMENTS 4,912,457 A    3/1990 Ladd .......................... 340/573
5,408,646 A    4/1995 Olnowich et al. ............ 395/575
5,675,507 A    10/1997 Bobo, II ...................... 364/514
5,905,777 A    5/1999 Foladare et al. ........... 379/90.01
6,012,084 A    1/2000 Fielding et al. ............. 709/205
6,026,404 A    2/2000 Adunuthula et al. .......... 707/10
6,038,296 A    3/2000 Brunson et al. ........ 379/100.11
6,075,844 A    6/2000 Goldberg et al. .......... 379/88.17
6,147,977 A    11/2000 Thro et al. ................... 370/265
6,175,859 B1    1/2001 Mohler ........................ 709/206
6,350,066 B1    2/2002 Bobo, II ................. 395/200.36
6,430,604 B1*   8/2002 Ogle et al. ................... 709/207
2002/0116477 A1*   8/2002 Somashekar et al. ........ 709/220
2002/0160757 A1    10/2002 Shavit et al. ................ 455/414

OTHER PUBLICATIONS

"Dynamic Resource Distribution Amongst Streams", IBM Research Disclosure, Oct. 1998, #41493.

* cited by examiner

*Primary Examiner*—Lashonda T Jacobs
(74) *Attorney, Agent, or Firm*—John E. Campbell; Blanche E. Schiller, Esq.; Heslin Rothenberg Farley & Mesiti P.C.

(57) ABSTRACT

Configurable, pluggable delivery managers are responsible for routing instant messages to intended recipients. A delivery manager is selected for a particular message, and that delivery manager defines, at runtime, a delivery policy to be used to route the instant message to an intended recipient of the message. The delivery policy is based upon a configuration of the delivery manager, a user configuration of the intended recipient, and one or more available delivery mechanisms. The delivery manager routes the instant message using the delivery policy.

7 Claims, 5 Drawing Sheets

INSTANT MESSAGE  300
| USER NAME  | JOHN SMITH |
| --- | --- |
| BODY | HELLO, JOHN. |
| PROPERTIES | PRIORITY = NORMAL<br>EXPIRES = CURRENT_TIME+3600 |
302 — USER NAME row
304 — BODY row
306 — PROPERTIES row
*fig. 3*
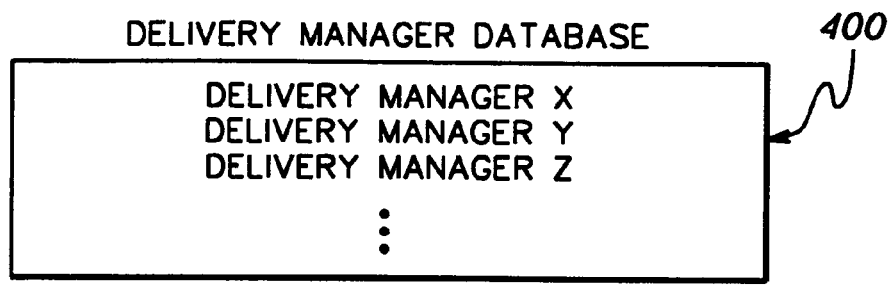
*fig. 4*
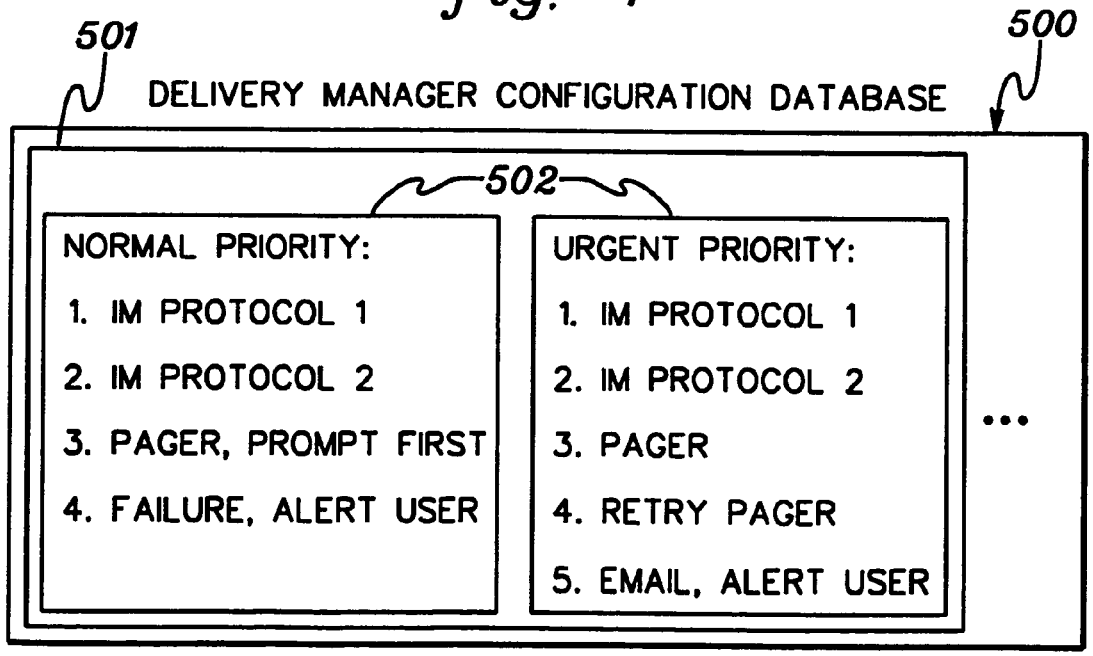
*fig. 5*

ROUTING INSTANT MESSAGES USING CONFIGURABLE, PLUGGABLE DELIVERY MANAGERS

CROSS-REFERENCE TO RELATED APPLICATIONS

This application is a divisional of co-pending U.S. patent application Ser. No. 09/866,410, filed May 25, 2001, entitled "Routing Instant Messages Using Configurable, Pluggable Delivery Managers," the entirety of which is hereby incorporated herein by reference.

TECHNICAL FIELD

This invention relates, in general, to instant messaging, and in particular, to providing a messaging environment in which configurable, pluggable delivery managers are used to route instant messages to intended recipients.

BACKGROUND OF THE INVENTION

In today's communication environments, instant messaging is common place. Users send messages to one or more intended recipients and expect that those messages will be delivered substantially instantly. Various mechanisms are used for instant messaging, including one or more instant messaging protocols, such as the SameTime protocol offered by International Business Machines Corporation or Instant Messenger offered by AOL. Other techniques are also used to send instant messages, such as pager gateways.

Although instant messaging is a common practice, frequently there are situations in which the message does not reach the intended recipient. For example, the messaging protocol is down or the intended recipient does not have access to the protocol sending the message (e.g., no computer access).

Thus, there is still a need for a capability that enhances the success rate with which an instant message reaches the intended recipient. A further need exists for an environment that is capable of providing a configurable and flexible delivery policy to be used to route messages to intended recipients.

SUMMARY OF THE INVENTION

The shortcomings of the prior art are overcome and additional advantages are provided through the provision of a method of routing instant messages. The method includes, for instance, selecting a delivery manager to route an instant message to an intended recipient of the instant message, the delivery manager being pluggable; configuring, at runtime, the delivery manager, wherein the configuring comprises selecting a configuration for the delivery manager from a set of one or more configurations, the selecting using content of the instant message to make the selection; querying, by the delivery manager, a user configuration of the intended recipient to determine one or more delivery mechanisms supported by the intended recipient; determining, by the delivery manager, one or more available delivery mechanisms; identifying, by the delivery manager, one or more delivery mechanisms that are common to a result of the querying and the determining to yield one or more possible delivery mechanisms; selecting, from the one or more possible delivery mechanisms, at least one delivery mechanism supported by the delivery manager; and routing the instant message to the intended recipient using the at least one delivery mechanism.

System and computer program products corresponding to the above-summarized method are also described and claimed herein.

Advantageously, a messaging environment is provided, in which delivery managers are plugged in, dynamically configured at runtime, and used to control the routing of instant messages from users to intended recipients. The delivery managers determine and apply delivery policies, which are based on user configurations, currently available delivery mechanisms, and the configuration of the delivery managers.

In an aspect of the present invention, an instant message delivery environment is provided, which integrates multiple protocols and notification services to provide a more robust, intelligent technique of synchronous communication.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 depicts one example of an instant message, in accordance with an aspect of the present invention;

FIG. 4 depicts one embodiment of a delivery manager database, in accordance with an aspect of the present invention;

FIG. 5 depicts one example of a delivery manager configuration database, in accordance with an aspect of the present invention;

BEST MODE FOR CARRYING OUT THE INVENTION

In accordance with an aspect of the present invention, a messaging environment is provided, in which delivery managers (i.e., routing logic modules) are plugged in, dynamically configured at run-time, and used to control the routing of instant messages from users to intended recipients (e.g., other users). The delivery managers determine and apply delivery policies, which are based on user configurations, currently available delivery mechanisms, and the configuration of the delivery managers, to route the messages.

Figure 1:
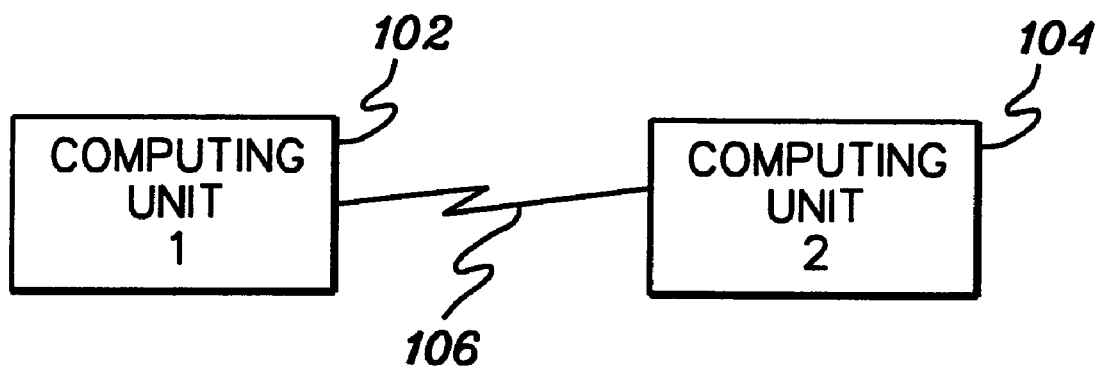
FIG. 1 depicts one embodiment of a computing environment incorporating and using aspects of the present invention.

One embodiment of a computing environment incorporating and using aspects of the present invention is depicted in FIG. 1. As depicted in FIG. 1, a computing environment 100 includes, for instance, at least one computing unit 102 coupled to at least one computing unit 104 via a connection 106. Each computing unit includes, for example, a personal computer, a workstation, a laptop computer, or any other type of computer. As one example, each unit is a personal computer based on the UNIX architecture. Further, the connection is a standard connection, such as any type of wire connection, token ring, or network connection, to name just a few examples. Alternatively, the connection is a communications channel, which may include one or more servers.

Executing on at least one of the computing units (e.g., Computing Unit 1) are one or more client applications that wish to send instant messages to one or more intended recipients (such as, users on Computing Unit 2 or other computing units). The client applications run in a messaging environment, which supports multiple diverse delivery managers that are responsible for routing the messages.

In accordance with an aspect of the present invention, the delivery managers can be dynamically added and/or configured at runtime. Thus, the user can select at runtime which delivery manager to use and how it is to be configured for a particular message. The delivery manager then uses a delivery policy to control delivery of that message. The delivery policy is constrained by recipient configuration, delivery manager configuration, and available delivery mechanisms, as described below.

One embodiment of the logic associated with routing an instant message from a user to an intended recipient is described with reference to FIG. 2. This logic is executed by, for instance, a client application of a computing environment.

Figure 2:
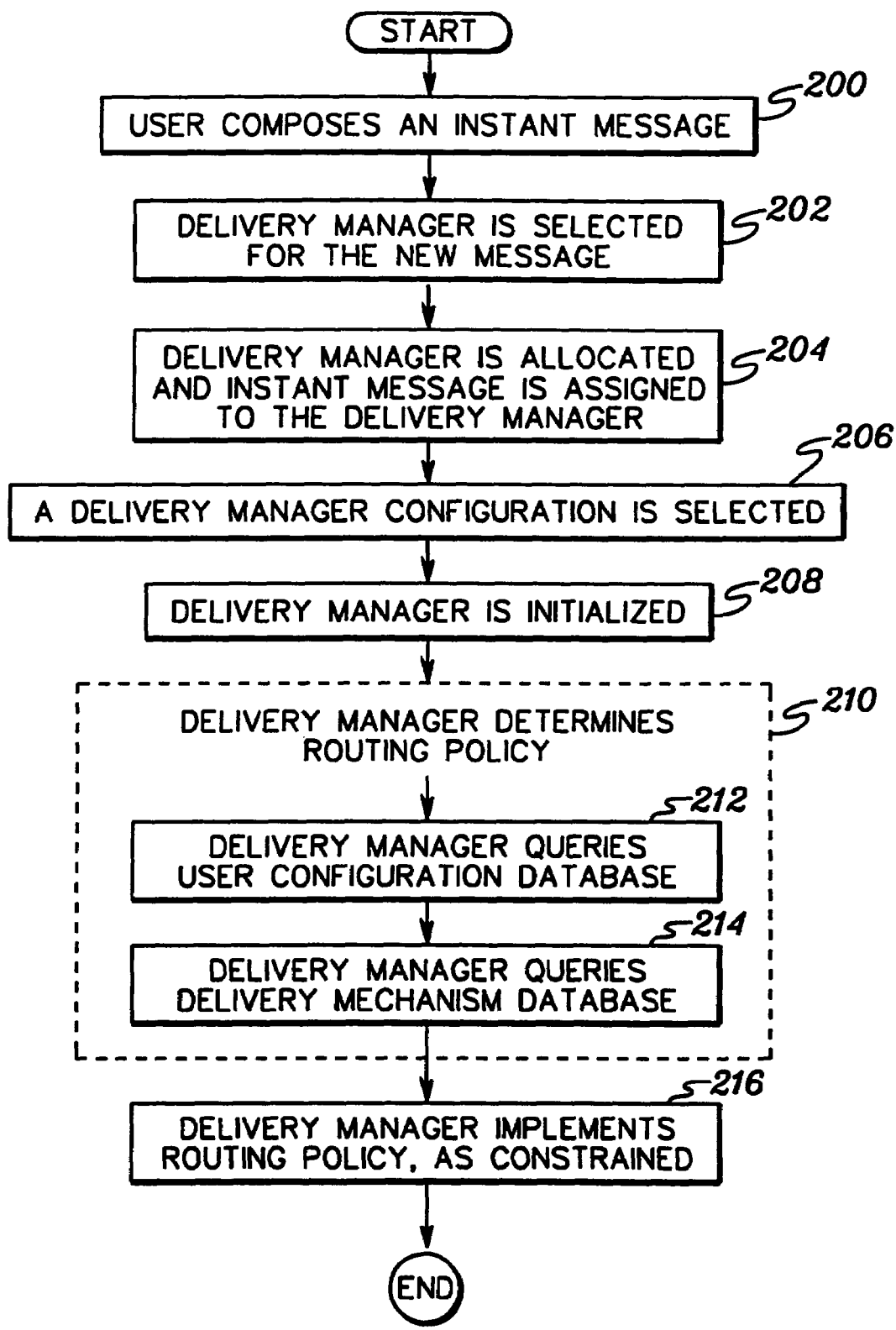
FIG. 2 depicts one embodiment of the logic associated with routing an instant message using a configurable and pluggable delivery manager, in accordance with an aspect of the present invention.

Referring to FIG. 2, initially, a user composes an instant message to be sent to the recipient, STEP 200. One example of such a message is depicted in FIG. 3. As shown, an instant message 300 includes, for instance, a user name 302 indicating the intended recipient of the message; a message body 304, including the message to be delivered to the intended recipient; and one or more optional properties 306. As one example, the properties include a variety of features, such as behavior (e.g., the priority of the message), an expiration date of when the message is to expire, and/or any other features, as desired.

Returning to FIG. 2, in addition to composing the message, a delivery manager, responsible for routing the particular message, is selected, STEP 202. For example, the client application presents a drop-down menu of a group of one or more available delivery managers, (e.g., available classes of delivery managers), and the user selects one of those managers. As a further example, the client application includes logic (e.g., a selection based on criteria, such as intended recipient, etc.) that selects a delivery manager from the group of available delivery managers.

The group of delivery managers is stored, for instance, within a database 400 (FIG. 4), which is accessible by the client application. That is, the database includes a list of available delivery managers. The delivery managers are pluggable and hot-swappable (e.g., can be added and/or changed at runtime). In particular, multiple implementations and functional variants of delivery managers may exist simultaneously and be dynamically added, removed or changed.

Referring again to FIG. 2, subsequent to selecting a particular class of delivery manager, an instance of the delivery manager is created and the message is assigned thereto, STEP 204. In the example presented herein, each message is assigned to its own delivery manager. However, in other embodiments, a delivery manager may service multiple messages.

Thereafter, a configuration for the delivery manager is selected from, for instance, a delivery manager configuration database, STEP 206. An example of one such database is depicted in FIG. 5. As shown, a delivery manager configuration database 500 includes a configuration table 501 for each delivery manager. Configuration table 501 includes one or more delivery manager configurations 502 for its respective delivery manager. These configurations are used to dynamically configure the delivery manager, at runtime.

In one embodiment, the particular configuration for the chosen delivery manager is selected based on the content of the message. For example, a value of one of the properties, such as priority, is used to determine which configuration is selected. That is, if Priority=Normal (see 306 of FIG. 3), then the configuration for Normal Priority (see FIG. 5) is selected. Similarly, if Priority=Urgent, then the configuration for Urgent Priority is selected.

Subsequent to selecting a configuration for the delivery manager, the delivery manager is initialized with the selected configuration data, STEP 208 (FIG. 2). This dynamically configures the delivery manager, and the delivery manager is ready to begin message routing.

As an initial step of the routing process, the delivery manager defines a routing policy to be used to route the message to the intended recipient, STEP 210. One component of defining the policy includes querying, by the delivery manager, a user configuration database to determine how the intended recipient would like to receive the message, STEP 212.

Figure 6:
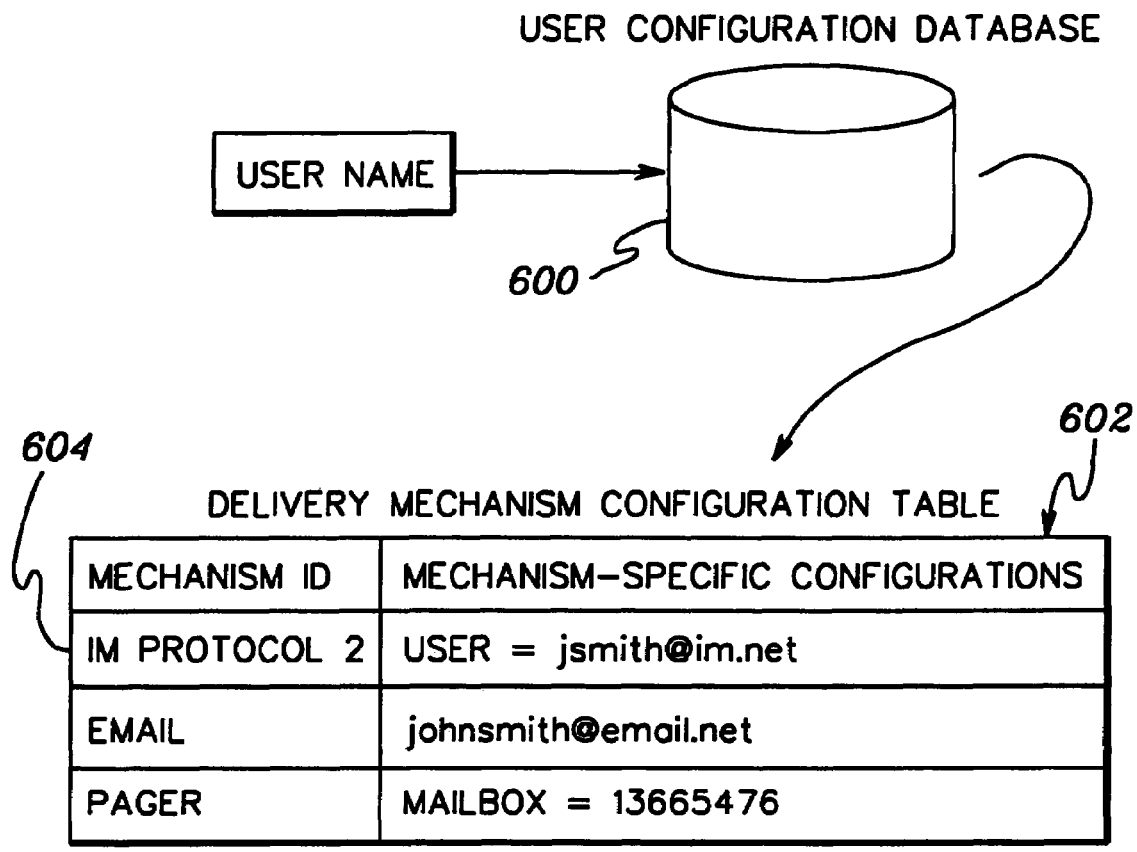
FIG. 6 depicts one embodiment of a user configuration database, in accordance with an aspect of the present invention.

One example of a user configuration database is depicted in FIG. 6. A user configuration database 600 includes a delivery mechanism table 602 for each valid message recipient. Each user's table includes configuration information 604 for one or more of the delivery mechanisms of the computing environment that are supported by that user. That is, each intended recipient is a logical user that has a presence at one or more logical locations, as defined by the table.

The configuration information includes an identification of each delivery mechanism supported by the user (e.g., Instant Messaging (IM) Protocol 2, Email, Pager), and mechanism-specific configurations. The mechanism-specific configurations include data, such as recipient login names on specific servers (e.g., user=jsmith@im.net, etc.), public keys for encrypted messaging protocols, etc.

The user name of the message is used as an index into the user configuration database to locate the table corresponding to that user. The delivery manager accesses the table to determine how the intended recipient desires to receive the message. In the example depicted in FIG. 6, the user name is John Smith, and the mechanisms for John Smith include: Instant Messaging Protocol 2, Email and Pager.

Returning to FIG. 2, in addition to querying the user configuration database to define a routing policy, the delivery manager also queries a Delivery Mechanism Database to determine the active delivery mechanisms of the computing environment, STEP 214. One example of such a database is depicted in FIG. 7.

Figure 7:
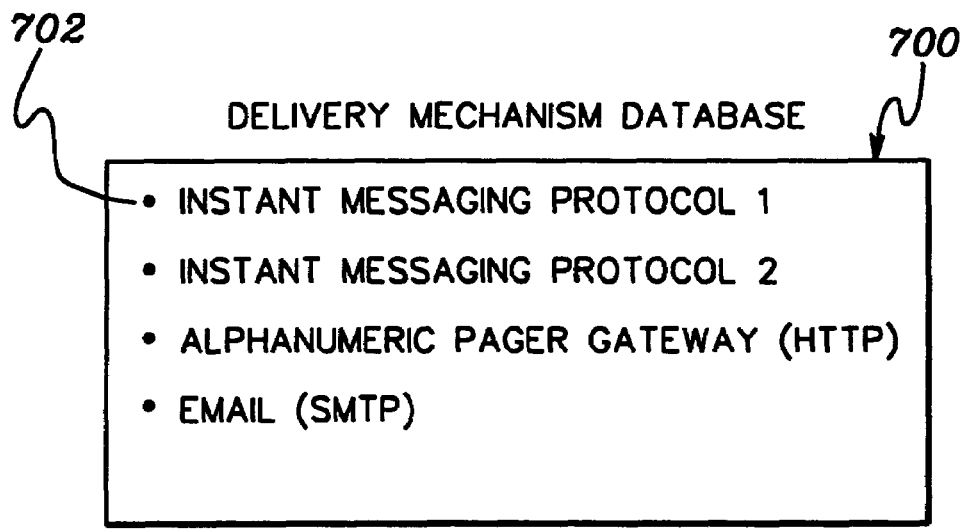
FIG. 7 depicts one example of a delivery mechanism database, in accordance with an aspect of the present invention.

As shown in FIG. 7, a Delivery Mechanism Database 700 includes one or more delivery mechanisms 702 currently capable of sending messages. This database is dynamically updated by, for instance, the client application to reflect the current operating environment.

The intersection of the delivery mechanisms of Delivery Mechanism Configuration Table 602 and the active delivery mechanisms of Delivery Mechanism Database 700 specifies the set of mechanisms available for routing the assigned instant message. For instance, in the particular example depicted herein, the set of mechanisms include Instant Messaging Protocol 2, Email and Pager. This set of mechanisms defines the routing policy to be used to route the message to the intended recipient.

The delivery manager implements the routing policy, as constrained, however, by its own configuration, STEP 216 (FIG. 2). (This constrained routing policy is referred to herein as the delivery policy.) For example, if the routing policy yields a set of mechanisms, which includes Instant Messaging Protocol 2, Email and Pager, but the delivery manager configuration does not include Email (see FIG. 5), then the delivery manager is limited to using Instant Messaging Protocol 2 and Pager.

The delivery manager applies the delivery policy to send the message to the intended recipient. In particular, the instant message is dispatched to one or more of the available delivery mechanisms of the delivery policy, serially or in parallel, as defined by the delivery policy. In this example, the delivery manager dispatches the instant message to Instant Messaging Protocol 2, and if the recipient is not available, then it initiates an alphanumeric page, after prompting the sender. This is indicated by the selected configuration (Normal Priority) of the delivery manager (see FIG. 5).

Figure 8:
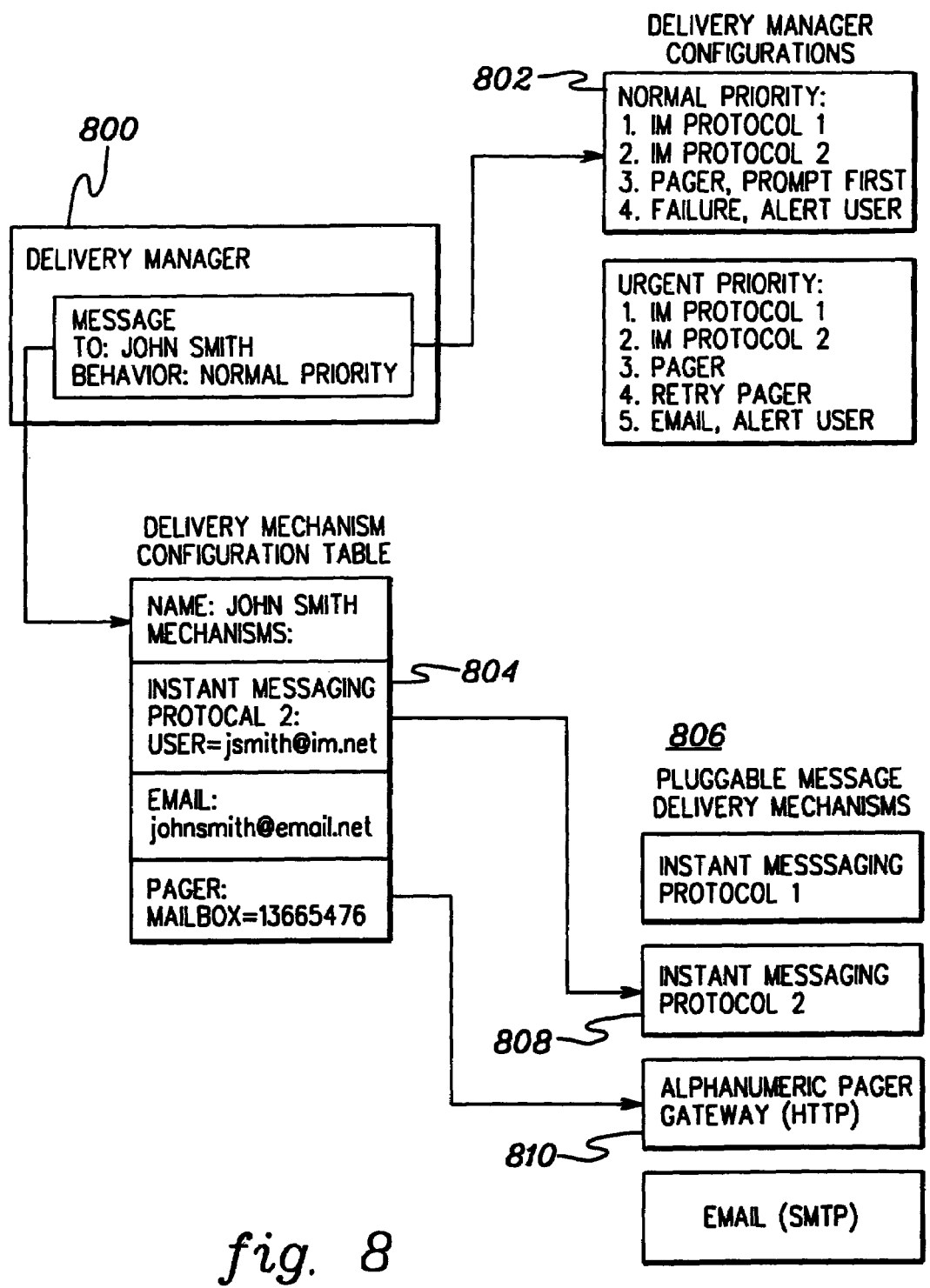
FIG. 8 depicts a particular routing example, which uses aspects of the present invention.

An overview of the particular example described herein is illustrated in FIG. 8. As shown, a selected delivery manager 800 is configured with Configuration 802. The delivery manager queries a Delivery Mechanism Configuration table 804 for John Smith and a Delivery Mechanisms Database 806 to define the routing policy to be used to send the message to John Smith. In this example, the routing policy includes Instant Messaging Protocol 2, Alphanumeric Pager, and Email. The routing policy, however, is constrained by configuration 802. That is, the delivery manager cannot use a mechanism that is not available to the delivery manager. Thus, the delivery manager defines a delivery policy, which is the routing policy constrained by configuration 802. In this example, the delivery policy includes Instant Messaging Protocol 2 (808) and Pager (810).

The delivery manager then uses one or more of the mechanisms of the delivery policy to route the message to John Smith. The manner in which these mechanisms are used is defined by configuration 802. Thus, in this example, the message is first sent by Instant Messaging Protocol 2, and then by pager, after prompting the sender.

Although a particular example is described above, the invention is not limited to such example. For example, additional and/or different delivery managers and/or delivery manager configurations are possible. Further, different recipients may have additional and/or different delivery mechanisms available to them. Also, at various times, additional and/or different message delivery mechanisms may be available.

Described in detail above is a pluggable, agent-driven, constraint-based instant messaging delivery environment. The delivery environment integrates multiple protocols and notification services to assist in providing a more robust, intelligent technique of synchronous communication. The environment provides robust message delivery by automatically leveraging and dynamically configuring many unreliable services simultaneously. When a user (e.g., one logical user) composes a message and dispatches it to one or more intended recipients (e.g., one or more other logical users on the same or different computing units), the system assigns it to a delivery manager. The delivery manager is an agent which assumes responsibility for routing the logical content of the message to the recipient. Message recipients have corresponding profiles, which specify how they may be contacted via different delivery mechanisms or messaging services. A delivery manager agent adheres to a delivery policy, which includes a message routing algorithm paired with an agent-specific configuration.

In one aspect of the invention, both the delivery managers and the delivery mechanisms are pluggable and hot-swappable, meaning that multiple implementations or functional variants may exist simultaneously and be dynamically added or removed. Delivery mechanisms support a common set of instant messaging functionality, providing an abstraction over a wide variety of network protocols and notification services. Delivery managers support a common message routing interface, with each variant implementing different delivery policies. Delivery policies may utilize any of the delivery mechanisms available at the time a message is dispatched. Delivery managers are selected on a per-message basis, according to user configurations, such as message priority.

Advantageously, one or more aspects of the present invention provide higher rates of successful message delivery, as compared to state of the art instant messaging solutions; incorporate delivery mechanisms not typically associated with instant messaging clients (e.g., pagers, e-mail); provide users with fine-grained, accurate control over message routing behavior, without requiring interaction on a per-message basis; and support new message delivery mechanisms (pluggable system components) that may be implemented and distributed apart from the core system, which allows incremental refinements and extensions. The client-side delivery managers efficiently route messages by applying these constraints based on the current operating environment and individual message requirements.

The above-described computing environment and/or computing units are only offered as examples. The present invention can be incorporated and used with many types of computing units, computers, processors, nodes, systems, work stations, and/or environments without departing from the spirit of the present invention.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of routing instant messages, said method comprising:

selecting a delivery manager from a plurality of available delivery managers, via a client application to route an instant message to an intended recipient of the instant message, wherein said delivery manager is pluggable;

configuring, said delivery manager at runtime via the client application wherein the configuring comprises selecting a configuration for said delivery manager from plurality of configurations, using content of the instant message;

querying, by the delivery manager, a user configuration database of the intended recipient to determine one or more available delivery mechanisms supported by the intended recipient;

querying, by the delivery manager, a delivery mechanism database to determine the active delivery mechanisms of the client application available for routing the instant message;

identifying, by the delivery manager, one or more delivery mechanisms that are common to a result of the querying of the user configuration database and the querying of the delivery mechanism database to yield one or more possible delivery mechanisms;

selecting, by the delivery manager, from the one or more possible delivery mechanisms, at least one delivery mechanism supported by the delivery manager; and routing, by the delivery manager, the instant message to the intended recipient using the at least one delivery mechanism.

2. The method of claim 1, wherein said at least one delivery mechanism supported by the delivery manager is included within the configuration of the delivery manager.

3. The method of claim 1, wherein said routing comprises dispatching, by the delivery manager, the instant message to one or more delivery mechanisms of the at least one delivery mechanism in accordance with a policy specified by said configuration of the delivery manager.

4. The method of claim 1, wherein at least one available delivery mechanism of said one or more available delivery mechanisms is pluggable.

5. The method of claim 1, wherein the delivery manager comprises a routing logic module.

6. The method of claim 1, further comprising creating an instance of the delivery manager based on the selected particular delivery managers.

7. The method of claim 1, wherein the selecting the configuration based on content comprises selecting the configuration based on priority of the instant message to be routed.

* * * * *